United States Patent
Zhang et al.

(10) Patent No.: US 10,102,495 B1
(45) Date of Patent: Oct. 16, 2018

(54) AUTOMATIC DETERMINATION THAT DELIVERY OF AN UNTAGGED ITEM OCCURS

(71) Applicant: Samsara Networks Inc., San Francisco, CA (US)

(72) Inventors: Jennifer Julia Zhang, San Francisco, CA (US); James Michael Rowson, San Francisco, CA (US); John Bicket, San Francisco, CA (US)

(73) Assignee: Samsara Networks Inc., San Francisco, CA (US)

( * ) Notice: Subject to any disclaimer, the term of this patent is extended or adjusted under 35 U.S.C. 154(b) by 0 days.

(21) Appl. No.: 15/846,201

(22) Filed: Dec. 18, 2017

(51) Int. Cl.
| | |
|---|---|
| *G06Q 10/00* | (2012.01) |
| *G06Q 10/08* | (2012.01) |
| *B60R 22/48* | (2006.01) |
| *B60R 16/023* | (2006.01) |
| *G08G 1/00* | (2006.01) |

(52) U.S. Cl.
CPC ....... *G06Q 10/0838* (2013.01); *B60R 16/023* (2013.01); *B60R 22/48* (2013.01); *G06Q 10/0833* (2013.01); *G08G 1/20* (2013.01); *B60R 2022/4816* (2013.01)

(58) Field of Classification Search
CPC ............ G06Q 10/0838; G06Q 10/0833; B60R 16/023; B60R 22/48; B60R 2022/4816; G08G 1/20
USPC ................................. 701/409; 705/333, 330
See application file for complete search history.

(56) References Cited

U.S. PATENT DOCUMENTS

| | | | | |
|---|---|---|---|---|
| 2002/0082954 | A1* | 6/2002 | Dunston | G06Q 10/087 705/28 |
| 2002/0087371 | A1* | 7/2002 | Abendroth | G06Q 10/02 705/37 |
| 2003/0036938 | A1* | 2/2003 | Dutta | G06Q 10/06312 705/7.22 |

OTHER PUBLICATIONS

Detrack—Features, downloaded from https://www.detrack.com/features/, 3 pages.
"Electronic Visit Verification App for Home Care Business—What to look for?" myGeoTracking Blog, downloaded from https://www.mygeotracking.com/blog/electronic-visit-verification-app-for-home-care/, 4 pages.
"Geofence-Based Electronic Visit Verification Solution," GPS Electronic Visit Verification System, myGeoTracking, 4 pages.
(Continued)

*Primary Examiner* — Marthe Y Marc-Coleman
(74) *Attorney, Agent, or Firm* — Nicholson De Vos Webster & Elliott LLP

(57) ABSTRACT

A method and apparatus for automatically determining that delivery of an untagged item occurred are described. Data is received, from a gateway device located on a vehicle on which the untagged item is transported, where the data includes data collected by the gateway device from a set of devices external to the gateway device. A determination of whether the vehicle stopped is performed based on a first part of the data pertaining to the movement of the vehicle. Automatic determination of whether offload of cargo from the vehicle occurred, is performed based on a second part of the data, which is consistent with activity indicative of the offload of cargo from the vehicle as opposed to data collected based on a tag on an item. Responsive to determining that the offload of cargo from the vehicle occurred, a report including information to be used as proof of delivery is transmitted.

30 Claims, 9 Drawing Sheets

(56) References Cited

OTHER PUBLICATIONS

"How Does it Work? Accurate App-based Freight Tracking—Badger," downloaded from https://badgersolution.com/how-does-it-work, 5 pages.
"Simply POD," Simply deliver, downloaded from https://simplydeliver.com/proof-of-delivery/, 4 pages.
"Mobile Time and Attendance Made Easy," GPS Time and Attendance, myGeoTracking, 4 pages.
"Mobile Workforce Management," myGeoTracking, downloaded from https://www.mygeotracking.com/, 3 pages.
"More than just Proof of Delivery Software with Tracking App," Track-POD, downloaded from https://www.track-pod.com/, 3 pages.
"Some Key Features of Our Proof of Delivery Software," Mobile Proof of Delivery Software, Automated real-time routing, dispatch & proof of delivery software, Mobileframe, downloaded from http://www.mobileframe.com/delivery-software/proof-of-delivery.html#features, 2 pages.
"Other benefits of MobileFrame's proof of delivery software," Mobile Proof of Delivery Software, Automated real-time routing, dispatch & proof of delivery software, Mobileframe, downloaded from http://www.mobileframe.com/delivery-software/proof-of-delivery.html#benefits, 2 pages.
"Perform 12% more deliveries / day with MobileFrame's proof of delivery software," Mobile Proof of Delivery Software, Automated real-time routing, dispatch & proof of delivery software, Mobileframe, downloaded from http://www.mobileframe.com/delivery-software/proof-of-delivery.html#overview, 2 pages.
"Proof of Delivery with GPS-Tagged Photo Messaging," myGeoTracking Blog, downloaded from https://www.mygeotracking.com/blog/proof-of-delivery-without-an-app/, 3 pages.

\* cited by examiner

RECEIVE, FROM A GATEWAY DEVICE LOCATED ON A VEHICLE ON WHICH THE UNTAGGED ITEM IS BEING TRANSPORTED, DATA INCLUDING DATA COLLECTED BY THE GATEWAY DEVICE FROM A SET OF ONE OR MORE OTHER DEVICES ON THE VEHICLE AND EXTERNAL TO THE GATEWAY DEVICE
310

THE DATA INCLUDES A PLURALITY OF LOCATION READINGS RECORDED FOR THE VEHICLE AT DIFFERENT TIMES DURING THE INTERVAL OF TIME
410

Fig. 4A

DETERMINE BASED ON A FIRST PART OF THE DATA PERTAINING TO THE MOVEMENT OF THE VEHICLE WHETHER THE VEHICLE HAS STOPPED FOR AN INTERVAL OF TIME IN A LOCATION FROM A SET OF ONE OR MORE SCHEDULED DELIVERY LOCATIONS FOR THE VEHICLE
330

DETERMINE WHETHER THE DIFFERENCE BETWEEN PAIRS OF A PLURALITY OF LOCATION READINGS IS SMALLER THAN A PREDETERMINED LOCATION DIFFERENCE THRESHOLD INDICATING THAT THE VEHICLE REMAINS AT A SAME LOCATION DURING THE INTERVAL OF TIME
430

DETERMINE WHETHER THE LOCATION IS INCLUDED IN A SET OF SCHEDULED DELIVERY LOCATIONS FOR THE VEHICLE
440

Fig. 4B

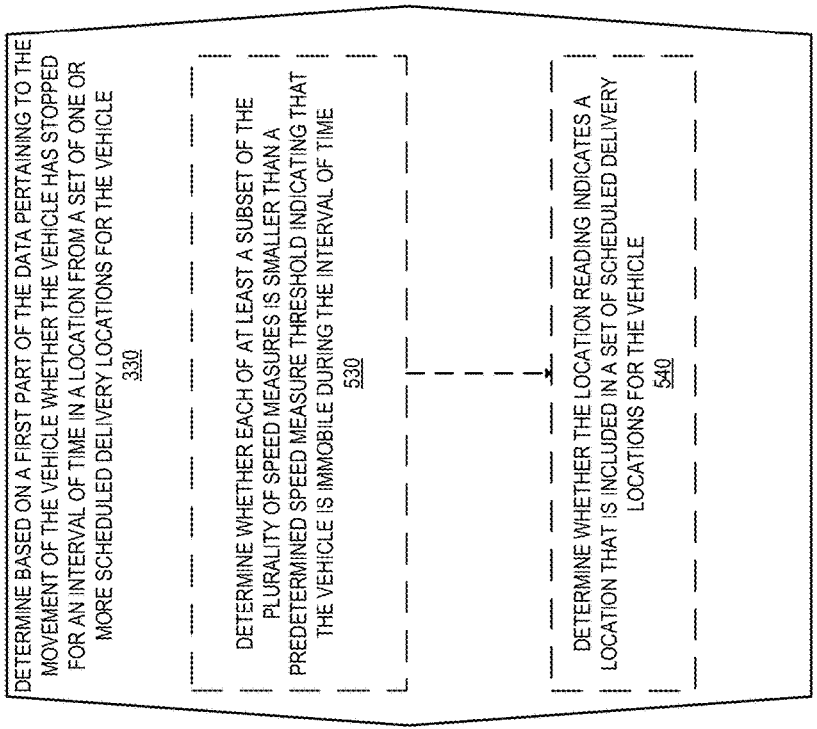
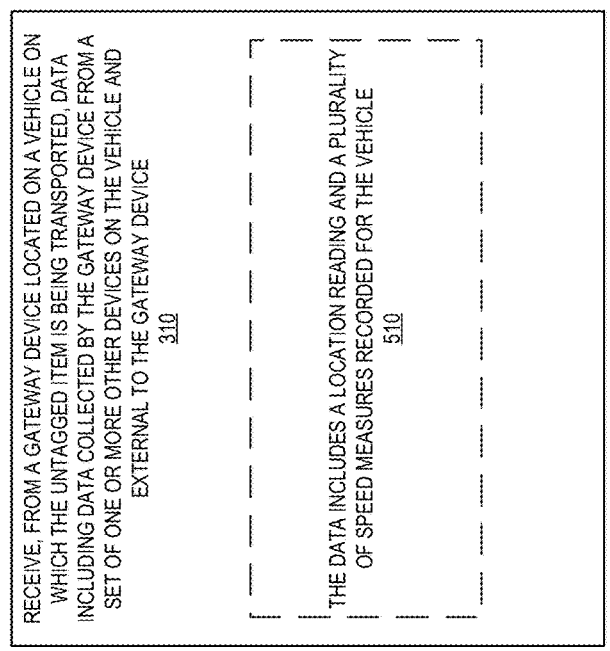
Fig. 5B
Fig. 5A

```
┌─────────────────────────────────────────────────────────────────────────┐
│ AUTOMATICALLY DETERMINE BASED ON A SECOND PART OF THE DATA, WHICH       │
│ INCLUDES AT LEAST SOME OF THE DATA COLLECTED FROM THE SET OR ONE OR     │
│ MORE OTHER DEVICES ON THE VEHICLE AND EXTERNAL TO THE GATEWAY DEVICE,   │
│ AND WHICH IS CONSISTENT WITH ACTIVITY INDICATIVE OF THE OFFLOAD OF      │
│ CARGO FROM THE VEHICLE AS OPPOSED TO DATA COLLECTED BASED ON A TAG ON   │
│ AN ITEM, WHETHER OFFLOAD OF CARGO FROM THE VEHICLE OCCURRED             │
│                                  340                                    │
└─────────────────────────────────────────────────────────────────────────┘
```

- DETERMINE BASED ON THE SECOND PART OF THE DATA WHETHER A DOOR OF THE VEHICLE [CARGO DOOR OR DOOR LOCATED ON THE DRIVER SIDE] WAS OPENED AT A FIRST TIME
  710

- DETERMINE BASED ON THE SECOND PART OF THE DATA WHETHER THE DOOR OF THE VEHICLE [CARGO DOOR OR DOOR LOCATED ON THE DRIVER SIDE] WAS CLOSED AT A SECOND TIME THAT IS LATER THAN THE FIRST TIME
  715

- DETERMINE WHETHER A DIFFERENCE BETWEEN THE FIRST TIME AND THE SECOND TIME EXCEEDS A PREDETERMINED THRESHOLD TIME
  720

- DETERMINE BASED ON THE SECOND PART OF THE DATA THAT THE SEAT BELT OF THE DRIVER IS UNBUCKLED DURING THE INTERVAL OF TIME
  730

- DETERMINE BASED ON THE SECOND PART OF THE DATA THAT A DRIVER OF THE VEHICLE HAS LEFT THE VEHICLE DURING THE INTERVAL OF TIME
  735

- DETERMINE THAT THE CARGO WAS OFFLOADED BASED ON IMAGE DATA RECORDED BY A CAMERA LOCATED IN THE CARGO AREA OF THE VEHICLE
  740

- DETERMINE THAT THE CARGO WAS OFFLOADED BASED ON A DISTANCE TO THE NEAREST OBSTRUCTION REPORTED BY A LOAD PRESENCE SENSOR
  745

- DETECT MOVEMENT INSIDE THE CARGO AREA OF THE VEHICLE BASED ON MOTION MEASUREMENTS DETECTED BY A MOTION SENSOR
  750

Fig. 7

AUTOMATIC DETERMINATION THAT DELIVERY OF AN UNTAGGED ITEM OCCURS

FIELD

Embodiments of the invention relate to the field of fleet management, and more specifically, to the automatic determination that a delivery of an untagged item occurred.

BACKGROUND

Delivery of goods is a growing sector of the economy. Proof of delivery (POD) is a process used to establish that a recipient received the goods or items sent by the sender. While several techniques exist for enabling the tracking of packages and goods, few solutions address the problem of untagged or untracked items.

Several delivery services deliver untagged items/goods. For example, services that offer school meals delivery or bakery goods delivery may not rely on proof-of-delivery systems that require each item or a group of items to be tagged or tracked as these systems are expensive to implement and require the involvement of a person to confirm delivery of the items by scanning the tag of each item. Several delivery services that manage delivery of untagged items still rely on paper systems, which are prone to human errors and loss of information.

SUMMARY

One general aspect includes a method, in a management server device located in the cloud, of automatically determining that a delivery of an untagged item occurred, the method including: receiving, from a gateway device located on a vehicle on which the untagged item is being transported, data including data collected by the gateway device from a set of one or more other devices on the vehicle and external to the gateway device; determining based on a first part of the data pertaining to the movement of the vehicle whether the vehicle has stopped for an interval of time in a location from a set of one or more scheduled delivery locations for the vehicle; responsive to determining that the vehicle has stopped at the location from the set of scheduled delivery locations for the vehicle during the interval of time, automatically determining based on a second part of the data, which includes at least some data collected from the set or one or more other devices on the vehicle and external to the gateway device, and which is consistent with activity indicative of the offload of cargo from the vehicle as opposed to data collected based on a tag on an item, whether offload of cargo from the vehicle occurred; and responsive to determining that the offload of cargo from the vehicle occurred, automatically transmitting a report to a user device, where the report includes information to be used as proof of delivery of the untagged item at the location.

One general aspect includes a management server device located in the cloud for automatically determining that a delivery of an untagged item occurred, the management server device including: a non-transitory computer readable storage medium to store instructions; and a processor coupled with the non-transitory computer readable storage medium to process the stored instructions to receive from a gateway device located on a vehicle on which the untagged item is being transported, data including data collected by the gateway device from a set of one or more other devices on the vehicle and external to the gateway device; to determine based on a first part of the data pertaining to the movement of the vehicle whether the vehicle has stopped for an interval of time in a location from a set of one or more scheduled delivery locations for the vehicle; responsive to determining that the vehicle has stopped at the location from the set of scheduled delivery locations for the vehicle during the interval of time, automatically determine based on a second part of the data, which includes at least some data collected from the set or one or more other devices on the vehicle and external to the gateway device, and which is consistent with activity indicative of the offload of cargo from the vehicle as opposed to data collected based on a tag on an item, whether offload of cargo from the vehicle occurred; and responsive to determining that the offload of cargo from the vehicle occurred, automatically transmit a report to a user device, where the report includes information to be used as proof of delivery of the untagged item at the location.

One general aspect includes a non-transitory computer readable storage medium that provide instructions, which when executed by a processor of a management server device located in the cloud, cause said processor to perform operations including: receiving, from a gateway device located on a vehicle on which an untagged item is being transported, data including data collected by the gateway device from a set of one or more other devices on the vehicle and external to the gateway device; determining based on a first part of the data pertaining to the movement of the vehicle whether the vehicle has stopped for an interval of time in a location from a set of one or more scheduled delivery locations for the vehicle; responsive to determining that the vehicle has stopped at the location from the set of scheduled delivery locations for the vehicle during the interval of time, automatically determining based on a second part of the data, which includes at least some data collected from the set or one or more other devices on the vehicle and external to the gateway device, and which is consistent with activity indicative of the offload of cargo from the vehicle as opposed to data collected based on a tag on an item, whether offload of cargo from the vehicle occurred; and responsive to determining that the offload of cargo from the vehicle occurred, automatically transmitting a report to a user device, where the report includes information to be used as proof of delivery of the untagged item at the location.

BRIEF DESCRIPTION OF THE DRAWINGS

The invention may best be understood by referring to the following description and accompanying drawings that are used to illustrate embodiments of the invention. In the drawings:

FIG. 4A illustrates a flow diagram of exemplary operations for receiving data from the gateway device, in accordance with some embodiments.

FIG. 4B illustrates a flow diagram of exemplary operations for determining based on a first part of the data, when the first part of the data includes location readings, whether the vehicle has stopped for an interval of time in a location from a set of delivery locations scheduled for the vehicle, in accordance with some embodiments.

FIG. 5A illustrates a flow diagram of exemplary operations for receiving data from the gateway device, in accordance with some embodiments.

FIG. 5B illustrates a flow diagram of exemplary operations for determining based on a first part of the data, which includes a location reading and multiple speed measures, whether the vehicle has stopped for an interval of time in a location from a set of delivery locations scheduled for the vehicle, in accordance with some embodiments.

FIG. 7 illustrates a flow diagram of exemplary operations for automatically determining based on a second part of the data, which is consistent with activity indicative of the offload of cargo from the vehicle as opposed to data collected based on a tag on an item, whether offload of cargo from the vehicle occurred, in accordance with some embodiments.

DESCRIPTION OF EMBODIMENTS

Figure 1:
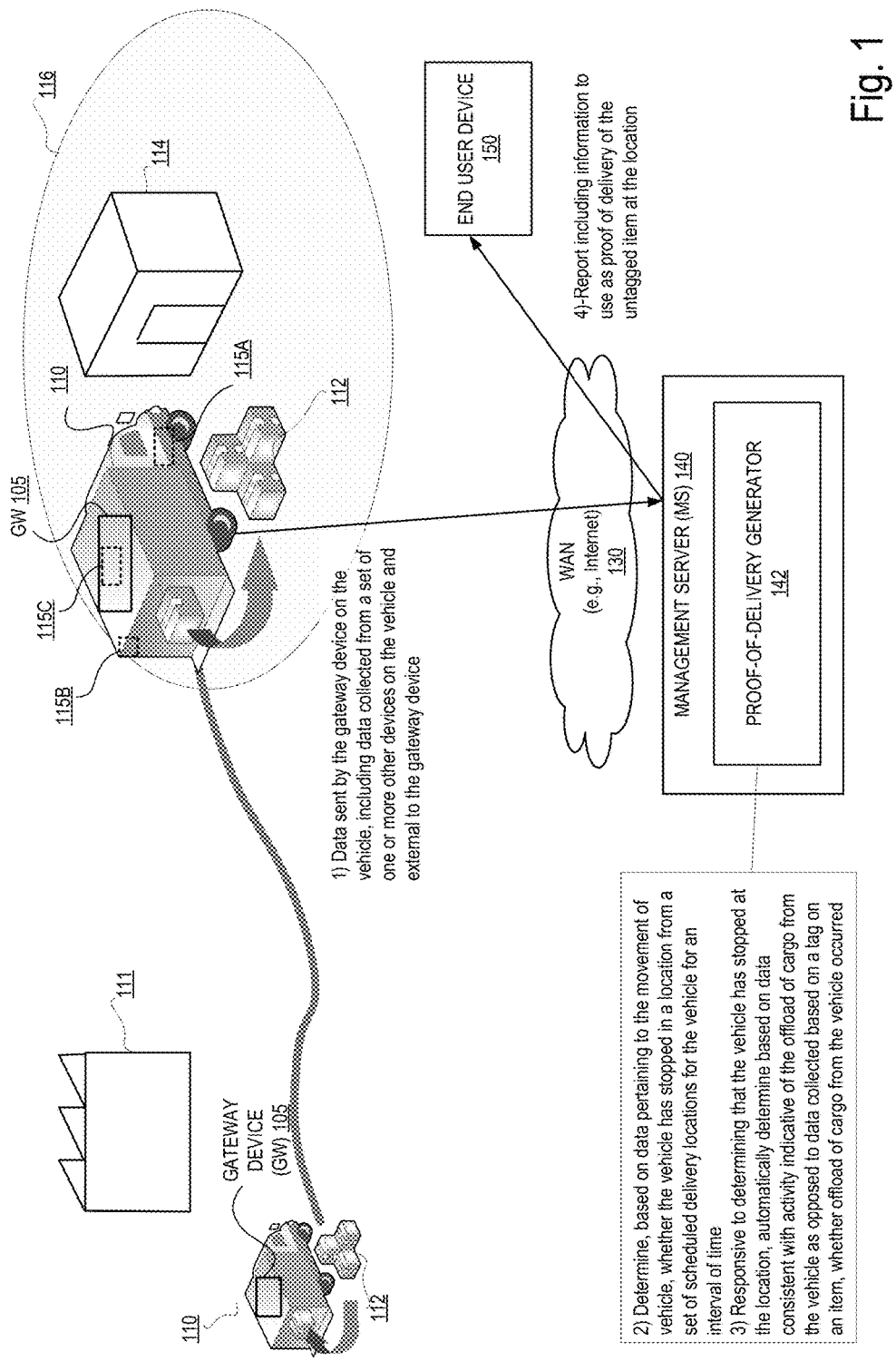
FIG. 1 illustrates a block diagram of an exemplary fleet management network for automatically determining that delivery of an untagged item has occurred, in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Systems and methods of automatically determining that a delivery of an untagged item occurred, are described. In some embodiments described herein below, techniques are presented that enable the automatic automation of detection that a delivery of goods occurred without requiring intervention from a person involved in the delivery (e.g., driver of the vehicle, or the customer receiving the goods, etc.). Further, in some embodiments described herein, the techniques enable the automatic detection of the delivery without requiring the item or goods delivered to be tagged or individually tracked.

According to some embodiments, a method and a management server device located in the cloud, determining that a delivery of an untagged item occurred are described. The management server receives from a gateway device located on a vehicle on which the untagged item is being transported, data including data collected by the gateway device from a set of one or more other devices on the vehicle and external to the gateway device. The management server determines based on a first part of the data pertaining to the movement of the vehicle whether the vehicle has stopped for an interval of time in a location from a set of one or more scheduled delivery locations for the vehicle. Responsive to determining that the vehicle has stopped at the location from the set of scheduled delivery locations for the vehicle during the interval of time, the management server automatically determines based on a second part of the data, which includes at least some data collected from the set or one or more other devices on the vehicle and external to the gateway device, and which is consistent with activity indicative of the offload of cargo from the vehicle as opposed to data collected based on a tag on an item, whether offload of cargo from the vehicle occurred. Responsive to determining that the offload of cargo from the vehicle occurred, the management server automatically transmits a report to a user device, wherein the report includes information to be used as proof of delivery of the untagged item at the location.

FIG. 1 illustrates a block diagram of an exemplary fleet management network for automatically determining that delivery of an untagged item has occurred, in accordance with some embodiments. The fleet management network includes a vehicle 110 and a management server 140.

The vehicle 110 can be any type of vehicle that can be used to transport and deliver goods. The vehicle 110 can be part of a fleet of vehicles operated by a fleet manager and is typically located remotely from the management server 140. The vehicle 110 can be a tractor coupled with a trailer part of a fleet used for transportation of goods. For example, the vehicle 110 can be a tractor, a tow truck, a semi-truck, a light or heavy truck or any other type of vehicle that is operative to be coupled with and pull a trailer. The vehicle can be a car, a van, a bus, a specialized vehicle or any other type of vehicle used for transportation of goods without departing from the scope of the present invention. The vehicle 110 departs from a first location 111, where one or more items 112 are loaded in the vehicle and transports the items 112 to a delivery location 114. The pick-up location can be any location scheduled for the vehicle for picking up the items 112. Non-limiting examples of pick-up locations can be a store, a warehouse, a manufacture, a restaurant, a residence, a school, etc. The delivery location is the destination of the items and can be a residence, a store, a warehouse, a school, a bakery, or any other type of locations where the items are expected to be delivered. The types of pick-up and delivery locations are intended to be exemplary only, and other types of locations can be contemplated.

In some embodiments, the items 112 transported from the pickup location 111 to the delivery location 114 can be perishable goods (such as bakery products, meals, etc.) or non-perishable items (e.g., documents, packages, construction material, etc.). Any type of packaged or non-packaged goods can be delivered without departing from the scope of the present invention. In some embodiments, the items 112 to be delivered are not tagged and therefore their transport and/or delivery cannot be tracked based on an identification of the items. In some embodiments, the each one of the items 112 can include a tag or alternatively a tag can be added to the entire set of items 112; however, the present techniques enable the detection that a delivery of the items occurred without requiring a user (e.g., a driver of the vehicle transporting the items 112, or a customer receiving the items 112) to scan or use the tag to confirm delivery. As it will be described in further details below, the determination that the delivery occurred is performed automatically without requiring an intervention from a user and is performed regardless of whether the delivers item(s) includes a tag or not.

The vehicle 110 includes a gateway device 105. The gateway device 105 may be located inside the vehicle or outside of the vehicle 110. The gateway device 105 is an electronic device and is operative to be coupled with the management server 140 through a Wide Area Network (WAN) 130. The connection to the WAN is a wireless connection (e.g., WiFi, cellular connection, etc.). In some embodiments, the gateway device 105 and the management server 140 may be subject to an intermittent connectivity with the WAN. The gateway device 105 is operative to record or obtain data related to the vehicle on which it is mounted and transmit the data to the management server 140. In some embodiments, the gateway device 105 is further operative to connect to a computing device of the vehicle 110. For example, the gateway device 105 can be coupled to the vehicle's computing device through an On-board diagnostics (OBD) port of the vehicle 110. The gateway device 105 can obtain data pertaining to events that occur in the vehicle (e.g., data related to components of the vehicle (such as the engine of the vehicle) and/or data originating from sensors located within the vehicle). The gateway device 105 is also operative to be coupled with one or more aftermarket devices (i.e., that are not installed by the vehicle's manufacturer) and which are external to the gateway device 105. These devices can include sensors and cameras operative to record data and transmit the data to the gateway device through wired or wireless connection(s). In some embodiments, the gateway device 105 is implemented as described in further details with reference to FIG. 10.

The management server 140 is a cloud-based server operative to receive data from one or more gateway devices (e.g., the gateway device 105). The data received from the gateway devices is used by the proof-of-delivery generator 142 to automatically deduce/determine that a delivery of an item has occurred. This determination is automatic and does not require the intervention of an observer (e.g., a driver of the vehicle, a manager of the site at which the vehicle is located, a customer receiving the delivery, etc.) that is physically present at the time the delivery occurs. In some embodiments, the management server 140 is implemented as described in further details with reference to FIG. 8.

The fleet management network further includes an end user device 150 that is a computing device (e.g., laptop, workstation, smartphone, palm top, mobile phone, tablet, etc.) capable of accessing network resources (e.g., it includes software such as web browsers or web applications that are capable of accessing network resources (e.g., HTTP client, FTP client, SSH client, Telnet client, etc.)). A user of the end user device 150 can connect to the management server 140 to access data about the vehicles of a fleet of vehicles. In some embodiments, the user of the end user device 150 accesses a fleet management service that is provided through the management server 140 to monitor and track the vehicles. The user of the end user device 150 can be the owner of the vehicle 110 and the gateway device 105. In some embodiments, the user is an administrator of the vehicle 110 and the gateway device 105. In other embodiments, the user is a customer of a delivery service that owns the fleet of vehicles. In other embodiments, the user can be the driver of the vehicle. The user device 150 is operative to receive a report including information to use as proof of delivery of the untagged item at the delivery location 114.

The vehicle 110 also includes one or more devices that generate and record data to be used for automatic detection of delivery of an item. While in the description below reference will be made to several devices, in some embodiments a single device can be used without departing from the scope of the present invention. In some embodiments, the devices can be included within the gateway device 105 (e.g., a location sensor such as a Global Positioning System (GPS) sensor 115C, a short range wireless communication interface to detect when the driver has moved away from the vehicle, etc.) or external to the gateway device 105 (e.g., device 115A, 115B). In some embodiments, some of the devices that are external to the gateway device 105 can be installed by the manufacturer of the vehicle. For example, the devices can be installed by the vehicle's manufacturer as safety measures. Data from these devices can be used by the vehicle's computing device to detect potential unsafe events and to alert the driver. As a non-limiting example, the devices that can be installed by the manufacturer of the vehicle can include a sensor to detect that a seat belt of a driver is buckled or unbuckled, a sensor to detect that a door of a vehicle (e.g., cargo door, driver door, etc.) has been opened, a camera (front-facing or outward facing camera that records image data inside and outside of the vehicle), or other devices that are installed in the vehicle at the time of manufacture and may provide information regarding the state of the vehicle at a given time.

The devices installed by the vehicle's manufacturer can be coupled with the vehicle's computing device through a wired or a wireless connection to transmit data. In some embodiments, the gateway device 105 may obtain data based on sensor measurements or image data generated by these devices through the computing device of the vehicle (e.g., through an on-board diagnostics (OBD) by which the gateway device 105 is coupled to the vehicle's computing device). In other embodiments, the gateway device 105 may be operative to communicate directly with the devices. As it will be discussed in further details below, when the data transmitted from the gateway device 105 to the management server 140 includes data originating from devices that are installed by the vehicle's manufacturer, this data is repurposed from being used in a conventional manner (e.g., detect unsafe events) to being used to detect activity indicative of the offload of cargo from the vehicle and consequently enable automatic detection of delivery of an item.

In some embodiments, the devices that are external to the gateway device 105 can include one or more devices that are aftermarket devices installed on the vehicle 110 and designed to be installed on vehicles regardless of the make and model of the vehicle. For example, the aftermarket devices can be wireless or wired sensors that are manufactured by the manufacturer of the gateway device 105 or by another manufacturer. The gateway device 105 is operative to communicate with the devices through a wired or a wireless connection. In a non-limiting example, devices that are aftermarket devices include at least one of a sensor for detecting movement of a door of the vehicle located on the driver side, a sensor for detecting the movement of a cargo door of the vehicle, a sensor for detecting that a seat belt of the driver of the vehicle is buckled or unbuckled. The devices can also include a load presence sensor that reports the distance to the nearest obstruction and can be used to determine the presence of cargo in the vehicle. In one exemplary scenario, this sensor can be mounted on the inside of the roof of the cargo area of the vehicle and can report that a cargo is present if there is an obstruction of the sensor nearer than the floor of the cargo area. The devices can also include a cargo area motion sensor to detect any motion inside the cargo area of the vehicle. In one exemplary scenario, this sensor is mounted inside the cargo area and pointed away from the door to detect motion when a person goes into the cargo area to retrieve the items to be delivered. The devices can also include a camera installed in the cargo area of the vehicle. In one exemplary scenario, image data from the cargo area camera can be used to detect that cargo was removed or added.

The various devices that generate and record data to be used for automatic detection of delivery of an item are electronic devices. Each electronic device may include one or more sensors for detecting physical events (e.g., temperature, humidity, barometric pressure, $CO_2$ concentration, acceleration, pressure, sound, movement, image data, etc.) and recording sensor measurements in response to the detection of these physical events. The devices can be small electronic devices that are attachable to an object for recording the sensor measurements (e.g., attached to a door of the vehicle, a roof of the vehicle, etc.). The devices may record sensor measurements or image data at regular intervals of time (e.g., they may detect the location of the vehicle, a temperature within the vehicle, record images/sound, and record corresponding measurements every N seconds or minutes). The devices are operative to be coupled to one or more gateway devices (e.g., gateway device 105) and establish a communication channel to transfer the recorded sensor measurements to the management server 140. In some embodiments, the devices can connect to the gateway device through a wireless communication interface (e.g., Bluetooth Low Energy (BLE), WiFi, etc.). Thus, the devices are operative to detect a gateway device and negotiate a connection to the gateway device.

While the embodiment of FIG. 1 describes several types of devices that are external to the gateway device 105 and which can transmit several types of data to the management server 140, in other embodiments only a subset of these data is sent or alternatively additional types of data and information can be transmitted without departing from the scope of the present invention.

When in operation, the system of FIG. 1 enables automatic detection that a delivery of an item occurred. In particular, the detection that the delivery of the item occurred is performed regardless of whether the item is tagged or not. At operation 1, the management server 140 receives data from the gateway device 105 located on the vehicle 110 on which the items 112 that are to be delivered to the location 114 are being transported. In some embodiments, the items 112 are untagged items and do not include an identification (e.g., electronic tag, or short-range communication protocol enabled device, etc.) for uniquely identifying an item or a group of items. In other embodiments, the items can include a tag; however, the tag is not relied upon to detect the delivery of the item. The data includes data collected by the gateway device 105 from a set of one or more other devices located on the vehicle 110 and that are external to the gateway device 105. The data includes a first part pertaining to the movement of the vehicle 110 and a second part, which is consistent with activity indicative of the offload of cargo from the vehicle 110. At operation 2, the management server 140 determines based on the first part of the data that pertains to the movement of the vehicle whether the vehicle has stopped for an interval of time in a location from a set of scheduled delivery locations for the vehicle 110.

Responsive to determining that the vehicle 110 has stopped at the location from the set of scheduled delivery locations for the vehicle during the interval of time, the management server 140 automatically determines (3) based on the second part of the data, whether offload of cargo from the vehicle occurred. The second part of data includes at least some data collected from the set of other devices located on the vehicle and that are external to the gateway device 105 (e.g., device 115A or device 115B). The second part of the data is consistent with activity indicative of the offload of cargo from the vehicle as opposed to data collected based on a tag on an item. Activity that is indicative of the offload of cargo from the vehicle may include movement of the driver, movement of the cargo door of the vehicle, movement of the door of the driver, release of a seat belt, a change detected in the presence of cargo in the cargo area of the vehicle. The list of activities indicative of the offload of cargo from the vehicle is intended to be an exemplary list and not an exhaustive list, other types of activities can be indicative of the offload of cargo from the vehicle without departing from the scope of the present invention. While embodiments herein are describe that the determination of whether offload of cargo from the vehicle occurred is performed in response to determining that the vehicle has stopped in a location scheduled for the vehicle, in other embodiments, the determination of whether offload occurred can be performed independently from the operation of determining that the vehicle has stopped at a scheduled delivery location or not. For example, in some embodiments, the order of operations can be inversed and operation (3) can be performed following operation (2).

At operation 4, responsive to determining that the offload of cargo from the vehicle occurred, the management server 140 automatically transmits a report to a user device. The report includes information that is to be used as proof of delivery of the items 112 at the location 114. In some embodiments, the report can include a confirmation that the delivery has occurred. When the report includes a confirmation that the delivery has occurred, it may also include additional information regarding the delivery. For example, the location and time of the delivery can be included in the report. An identification of the vehicle and/or an identification of the driver of the vehicle may be included. The report can also include sensor measurements such as temperature, humidity, or other measurements relating to the items that are delivered. In other embodiments, the report can include an indication that the delivery has not occurred. In these embodiments, an alert indicating that the delivery has not occurred can be sent to the driver, the manager/supervisor of the driver, or the customer for whom the delivery is intended.

The operations described herein enable an automatic detection that a delivery of an untagged or untracked item has occurred. A management server upon receipt of data from the gateway device automatically determines that the vehicle has reached a delivery location scheduled for the vehicle and automatically determines that cargo is being offloaded (or that offload of the cargo has been completed) from the vehicle. These determinations enable the management server to generate a report for an interested user (e.g., manager, customer, driver, etc.) that the delivery has occurred without receiving an input from a person involved in the delivery or requiring identification of the delivered item through a tagging mechanism. For example, the driver of the vehicle does not need to scan a tag added to the item to identify and confirm delivery of the item at the delivery location. Further, the person receiving the delivered item does not need to sign and/or confirm receipt of the item. Thus, the proof of delivery is obtained without requiring individual or group tracking/tagging of the delivered items and without requiring a signature for the delivery. These techniques present several advantages when compared with existing solutions of proof-of-delivery. In particular in scenarios where the tagging or tracking of individual item is not an option of interest (e.g., delivery of school meals, delivery of bakery items, delivery of construction material to construction sites, etc.), the automatic detection that a delivery occurred is advantageous. The techniques presented herein are less expensive, more accurate than a conventional paper proof-of-delivery system, and less error prone than systems relying on tag scanning where a person is relied on for scanning and confirming the delivery of the item. In addition, the techniques described herein allow a real time reporting of the delivery as alerts can be transmitted (confirming delivery or not) when the vehicle stops at a delivery location. The embodiments described herein can be part of a proof of delivery solution that can also incorporate additional delivery confirmation elements such as signatures, captured images of delivered items, etc.

Figure 2:
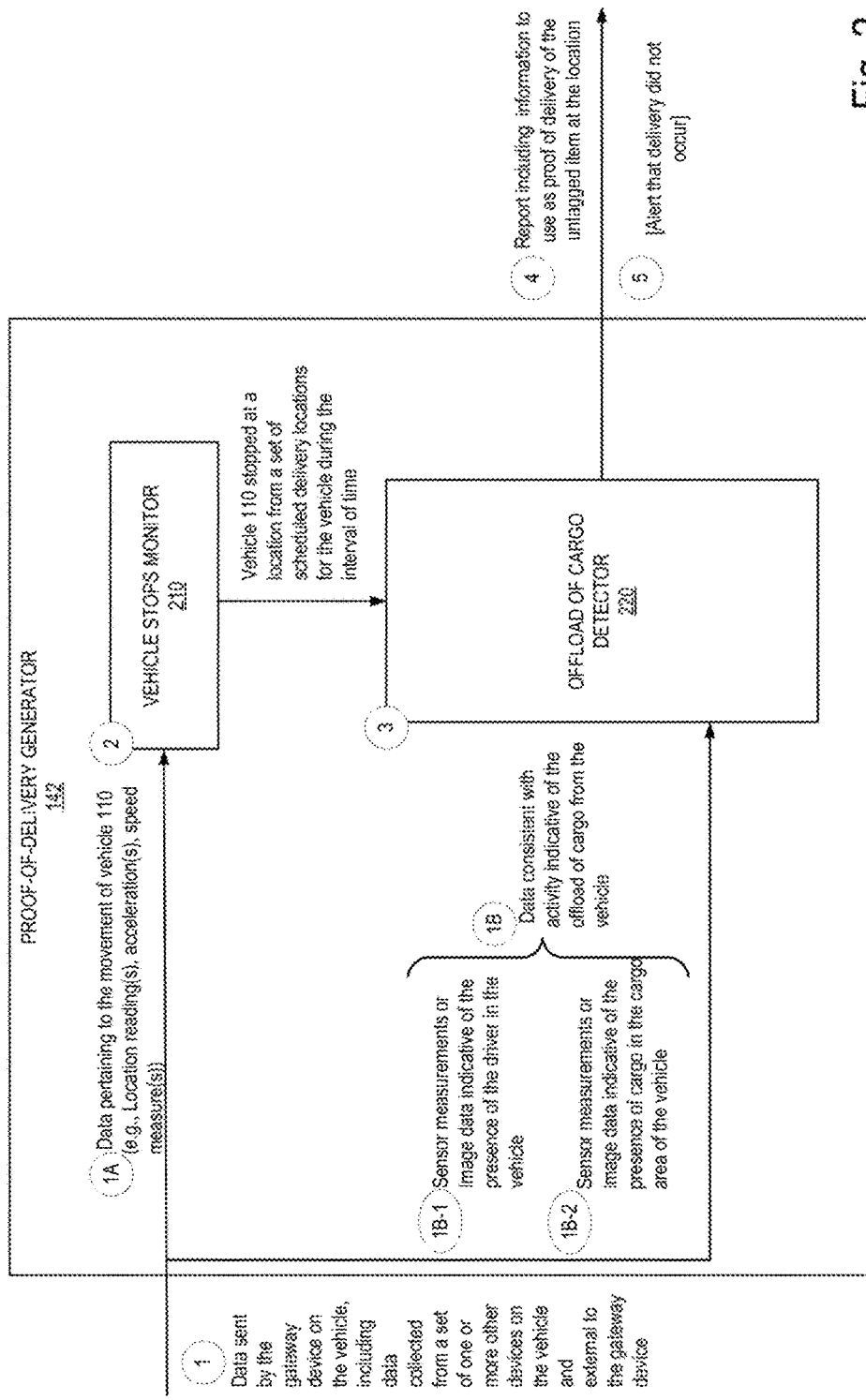
FIG. 2 illustrates a block diagram of an exemplary proof of delivery generator, in accordance with some embodiments.

FIG. 2 illustrates a block diagram of an exemplary proof of delivery generator, in accordance with some embodiments. The proof-of-delivery generator 142 is located within the management server 140 and is operative to automatically determine based on data received from the gateway device 105 that a delivery of an item occurred. The proof-of-delivery generator 142 receives data sent by the gateway device 105 located on the vehicle 110. The data includes data collected from a set of one or more other devices on the vehicle and external to the gateway device. The data (1) sent by the gateway device 105 includes data (1A) pertaining to the movement of vehicle 110. For example, the data (1A) pertaining to the movement of the vehicle 110 can include readings recorded by a location sensor. The location sensor can be located within or outside of the gateway device 105. For example, the location sensor can be a GPS sensor and the location readings are GPS coordinates. The location readings include one or more readings indicating the location of the vehicle at one or more times. In some embodiments, each location reading can include a longitude, latitude and an associated timestamp. The timestamp can indicate the time at which the latitude and longitude were recorded by the location sensor; alternatively the timestamp can indicate the time at which the latitude, longitude are transmitted from the gateway device or received by the management server 140.

The data (1A) pertaining to the movement of the vehicle 110 can include acceleration measures recorded by an accelerometer. The accelerometer can be located within or outside of the gateway device 105. The acceleration measures include one or more measures indicating the acceleration of the vehicle at different times. In some embodiments, each acceleration measure is associated with a timestamp. The timestamp can indicate the time at which the acceleration is recorded by the accelerometer; alternatively, the timestamp can indicate the time at which the acceleration measure is transmitted from the gateway device or received by the management server 140.

The data (1A) pertaining to the movement of the vehicle 110 can include speed measures. The speed measures can be obtained by the gateway device 105 from the vehicle's computing device or alternatively computed by the gateway device 105 based on acceleration measures and/or location readings for the vehicle. The speed measures include one or more readings indicating the speed of the vehicle at different times. In some embodiments, each speed measure is associated with a timestamp. The timestamp can indicate the time at which the speed is determined by the gateway device 105; alternatively, the timestamp can indicate the time at which the speed measure is transmitted from the gateway device or received by the management server 140.

In addition to the data (1A) pertaining to the movement of the vehicle, the data (1) sent by the gateway device 105 includes data (1B) consistent with activity indicative of the offload of cargo from the vehicle. Several types of data can be consistent with activity indicative of the offload of cargo from the vehicle. For example, the data (1B) can include sensor measurements or image data indicative of the presence of the driver in the vehicle (1B-1) and/or sensor measurements or image data indicative of the presence of cargo in the vehicle (1B-2).

The proof-of-delivery generator 142 includes a vehicle stops monitor 210 and an offload of cargo detector 220. The vehicle stops monitor 210 receives the first part of the data that is sent by the gateway device 105 (data (1A) pertaining to the movement of the vehicle) and determines, based on this data (1A) whether the vehicle has stopped in a location from a set of scheduled delivery locations for the vehicle for an interval of time.

In some embodiments, when the data pertaining to the movement of the vehicle 110 includes several location readings received from the gateway device indicating the location of the vehicle over a period of time, the vehicle stops monitor 210 determines whether the vehicle has stopped in a given location by determining that a difference between pairs of the multiple location readings is smaller than a predetermined location difference threshold. Satisfying the threshold criteria indicates that the vehicle remains at a same location during the interval of time. In some embodiments, the predetermined location difference threshold can be zero, indicating that the location readings are identical over the period of time. In other embodiments, the predetermined location difference threshold is a small value that is greater than zero allowing the vehicle stops monitor 210 to account for measurement errors that may be caused by the location sensor. In some embodiments, instead of determining that all location readings satisfy the difference criteria the vehicle stops monitor 210 may determine that the vehicle remains at a same location when at least a subset of the location readings satisfy the threshold criteria. For example, the vehicle stops monitor 210 can determine that the vehicle 110 has stopped at a given location for a given interval of time, if a significant percentage (e.g., 80%, 90%, etc.) of the location readings is sufficiently close from one another (i.e., the difference between pairs of the location readings is smaller than the predetermined location difference threshold) for the given interval of time.

In some embodiments, when the data pertaining to the movement of the vehicle 110 includes at least one location reading and one or more speed measures received from the gateway device 105, the vehicle stops monitor 210 determines whether the vehicle has stopped in a given location by determining that each one of the multiple speed measures is smaller than a predetermined speed measure threshold. The satisfaction of the threshold criteria indicates that the vehicle remains immobile during the interval of time. In some embodiments, the predetermined speed measure threshold can be zero indicating that the vehicle is not moving during the interval of time. In other embodiments, the predetermined speed measure threshold is a small value that is greater than zero allowing the vehicle stops monitor 210 to account for measurement errors that may be caused by the sensor recording the speed (or acceleration from which the speed is derived). In some embodiments, instead of determining that all speed measures satisfy the threshold criteria the vehicle stops monitor 210 may determine that the vehicle remains immobile when at least a subset of the speed measures satisfy the threshold criteria. For example, the vehicle stops monitor 210 can determine that the vehicle 110 remains immobile at a given location for a given interval of time, if a significant percentage (e.g., 80%, 90%, etc.) of the speed measures is sufficiently close to the predetermined speed threshold for the given interval of time.

Other mechanisms can be used to determine that the vehicle has stopped at a given location and remains at that location during a given interval of time. For example, the vehicle stops monitor 210 can determine using a combination of location readings and speed measures that the vehicle has stopped after being in movement at a given location. In another example, the vehicle stops monitor 210 can detect when the vehicle stops by receiving data indicating that the engine of the vehicle is on or off.

Once the vehicle stops monitor 210 determines that the vehicle has stopped, it determines that the location at which the vehicle has stopped is included in a set of scheduled delivery locations for the vehicle. The management server 140 includes information related to deliveries that are to be performed by the vehicle and reconciles this information with the location of the vehicle to confirm whether this location is part of delivery locations scheduled for the vehicle. In some embodiment, the vehicle can be associated with a route including a set of one or more stops scheduled for the vehicle for a given day or more generally for a period of time. In some embodiments, the route further includes times and/or dates of when the delivery is expected to occur. The expected delivery times/dates may be used to determine whether the delivery occurred at the corresponding expected time/date and if an alert is to be sent to confirm or that the delivery occurred as planned or not.

Once the vehicle stops monitors 210 determines that the vehicle 110 stops at a location for an interval of time, the offload of cargo detector 220 is triggered and automatically determines based on data consistent with activity indicative of the offload of cargo from the vehicle, whether offload of cargo from the vehicle occurred. The offload of cargo detector 220 uses data that is indicative of the presence of the driver in the vehicle (1B-1) and/or data indicative of the presence of the cargo in the cargo area of the vehicle (1B-2) to determine whether the offload of cargo occurred. The data that is indicative of the presence of the driver in the vehicle (1B-1) can include sensor measurements indicative of the movement of a door of the vehicle located on the driver side, one or more indications of whether a seat belt of the driver of the vehicle is buckled or unbuckled, image data recorded by a camera located within the vehicle, and/or a short range wireless communication data to detect when the driver moves away from the vehicle, etc.

In some embodiments, a single type of these data can be used to assess whether the driver has left the vehicle after the vehicle stopped. In other embodiments, a combination of two or more types of this data can be used to assess whether the driver has left the vehicle or not. In a non-limiting example, the offload of cargo detector 220 may determine based on the second part of the data that the door of the vehicle located on the driver side was opened at a first time. The offload of cargo detector 220 may also determine based on the second part of the data that the door of the vehicle located on the driver side was closed at a second time that is later than the first time and determine that a difference between the first time and the second time exceeds a predetermined threshold time. This can be used by the offload of cargo detector 220 to confirm whether or not a delivery of the item has occurred by determining that the door of the vehicle was opened and closed after a given interval of time that is consistent with activity performed when a delivery is performed (i.e., the driver exiting the vehicle and reentering the vehicle after an amount of time has elapsed). In some embodiments, the predetermined threshold time can be set by an administrator of the fleet management system and may depend on the type of delivery that is scheduled. For example, a delivery of a single package needs less time than a delivery of an entire order of bread to be delivered at a bakery, or meals delivered at a school cafeteria. In other embodiments, the predetermined threshold time can be determined using machine learning, where the proof-of-delivery generator 142 is trained on past delivery time differences between the first time the door is opened and the second time the door is closed.

In another non-limiting example, the offload of cargo detector 220 may determine based on the second part of the data that seat belt of the driver of the vehicle is unbuckled after the vehicle stops and is buckled back in after a time interval elapses. This may be used as an indication that the delivery was performed. In another non-limiting example, image data recorded by a camera located within the vehicle can be analyzed to automatically determine whether the driver of the vehicle leaves the vehicle during the interval of time that the vehicle is stopped, therefore confirming that a delivery of the items occurs. In another example, a short-range wireless communication protocol can be used to detect when the driver moves away from the vehicle indicating that the driver is taking part in delivery of the items at the delivery location. In another example, the offload of cargo detector 220 may determine based on the second part of the data that the vehicle's engine is used to power a secondary mechanism (e.g., when the vehicle's engine is used to raising/lowering the cargo area in a dump truck or the ramp on a tow truck, running a pump on a liquid container truck, etc.), that the parking brake is engaged as further evidence of the vehicle making a longer duration stop, can compare the engine RPM used before and after a stop to detect if significantly less engine power is needed to move the vehicle indicating that a large cargo was dropped off, or can connect to a refrigeration unit on a vehicle and determine if the refrigeration was running before a stop and was turned off after a stop indicating that a delivery was made. In some embodiments, one or more of these data and mechanisms can be used alone or in combination to detect whether or not offload of cargo is occurring at the delivery location 114.

The determination that offload of cargo occurs can also be based on data indicative of the presence of the cargo in the cargo area of the vehicle (1B-2). The data indicative of the presence of the cargo in the cargo area of the vehicle (1B-2) may include sensor measurements indicative of the movement of the cargo door of the vehicle, image data recorded by a camera located in the cargo area of the vehicle, a load presence sensor that reports the distance to the nearest obstruction and can be used to determine the presence of cargo in the vehicle, and motion sensor to detect any motion inside the cargo area of the vehicle.

In another non-limiting example, the offload of cargo detector 220 may determine based on the second part of the data that the cargo door of the vehicle was opened at a first time. The offload of cargo detector 220 may also determine based on the second part of the data that the cargo door of the vehicle was closed at a second time that is later than the first time and determine that a difference between the first time and the second time exceeds a predetermined threshold time. This can be used by the offload of cargo detector 220 to confirm whether or not a delivery of the item has occurred by determining that the cargo door of the vehicle was opened and closed after a given interval of time that is consistent with activity performed when a delivery is performed (i.e., the cargo door was opened for a predetermined threshold time that allows for offload of the cargo from the vehicle). In some embodiments, the predetermined threshold time can be set by an administrator of the fleet management system and may depend on the type of delivery that is scheduled. For example, a delivery of a single package can require less time than a delivery of an entire order of break to be delivered at a bakery, or meals delivered at a school cafeteria. In other embodiments, the predetermined threshold time can be determined using machine learning, where the proof-of-delivery generator 142 is trained on past delivery time differences between the first time the cargo door is opened and the second time when the cargo door is closed.

In some embodiments, in addition to or instead of detecting that a cargo door was opened and closed, the offload of cargo detector 220 may determine whether movement is detected inside the cargo area (indicating that one or more items are being offloaded) and/or whether cargo is detected inside the cargo area (e.g., based on image data recorded by a camera located in the cargo area of the vehicle or based on the load presence sensor that reports the distance to the nearest obstruction and is used to determine the presence of cargo in the vehicle). In some embodiments, one or more of these data and mechanisms can be used alone or in combination to detect whether or not offload of cargo is occurring at the delivery location 114.

Responsive to determining that the offload of cargo from the vehicle occurred, the offload of cargo detector 220 causes the automatic transmission of a report to a user device. The report includes information that is to be used as proof of delivery of the items 112 at the location 114. In some embodiments, the report can include a confirmation that the delivery has occurred. When the report includes a confirmation that the delivery has occurred, it may also include additional information regarding the delivery. For example, the location and time of the delivery can be included in the report. An identification of the vehicle and/or an identification of the driver of the vehicle may be included. The report can also include sensor measurements such as temperature, humidity, or other measurements relating to the items that are delivered. In other embodiments, the report can include an indication that the delivery has not occurred. In these embodiments, an alert indicating that the delivery has not occurred can be sent to the driver, the manager/supervisor of the driver, or the customer for whom the delivery is intended. In some embodiments, the proof of delivery generator 142 may be configured with criteria for triggering alerts when no activity consistent with offload of cargo is detected at a delivery location scheduled for the vehicle 110. For example, an alert can be set to be triggered if the vehicle stops at a scheduled delivery location but no activity consistent with offload of cargo is detected for a predetermined amount of time after the vehicle has stopped. In another example, an alert can be set to be triggered when it is detected that the vehicle stopped at a location that is not part of a list of scheduled delivery locations. In a third example, an alert can be set to be triggered when it is detected that an expected time for delivery of an item, the vehicle has not yet reached the scheduled delivery location. Other types of alerts can be set up without departing from the scope of the present invention.

The operations in the flow diagrams of FIGS. 3-7 will be described with reference to the exemplary embodiments of FIGS. 1-2. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
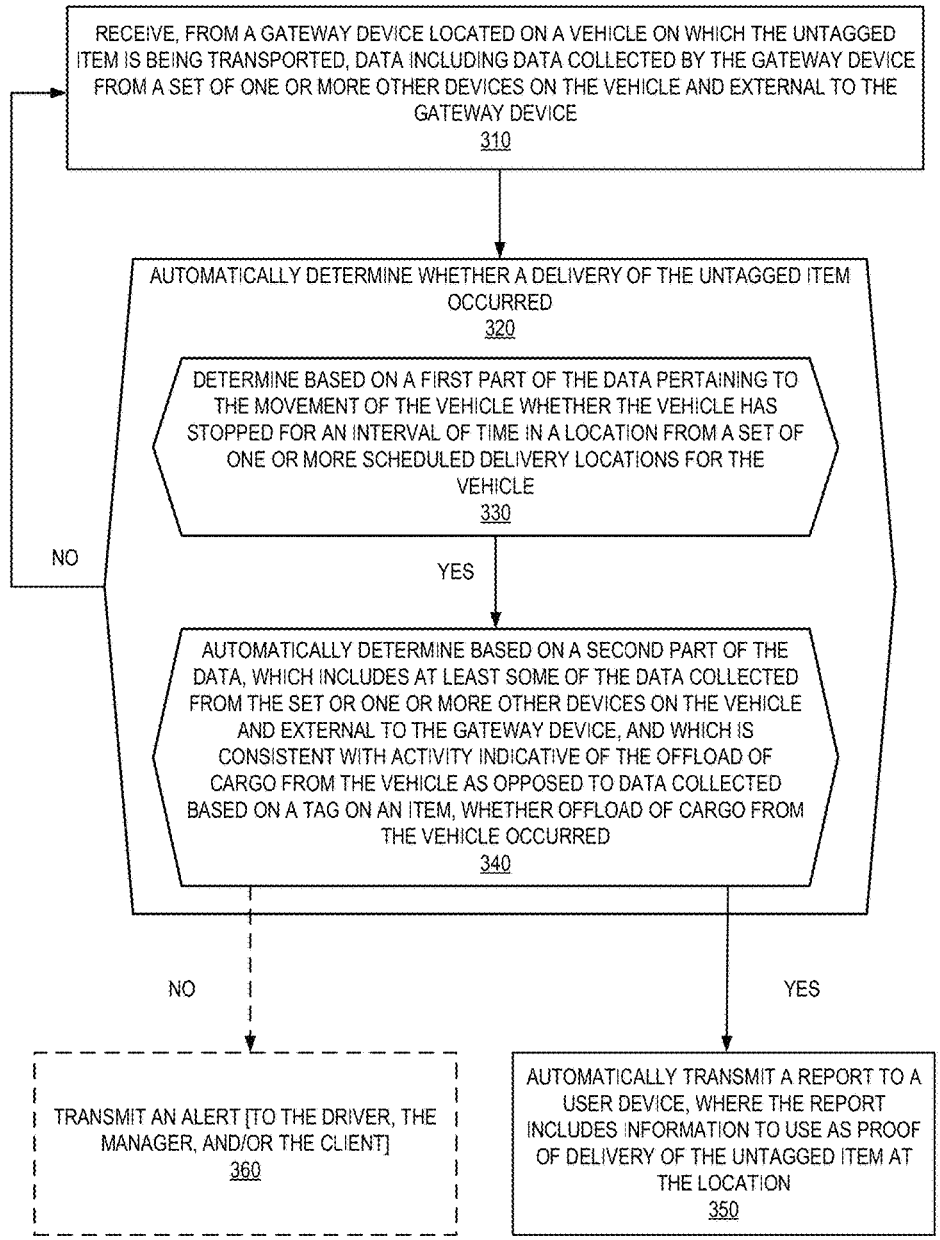
FIG. 3 illustrates a flow diagram of exemplary operations for automatically determining that delivery of an untagged item has occurred, in accordance with some embodiments.

FIG. 3 illustrates a flow diagram of exemplary operations for automatically determining that delivery of an untagged item has occurred, in accordance with some embodiments. The operations of the flow diagram of FIG. 3 are performed by the proof-of-delivery generator 142 of the management server 140. At operation 310, the management server 140 receives from a gateway device (e.g., gateway device 105) located on a vehicle (e.g., vehicle 110) on which an untagged item (e.g., one of the items 112) is being transported, data including data collected by the gateway device 105 from a set of one or more other devices on the vehicle and external to the gateway device (e.g., devices 115A and 115B). At operation 320, the management server 140 automatically determines whether a delivery of the untagged item has occurred. Automatically determining whether the delivery of the untagged item occurred includes operations 330 and 340.

At operation 330, the management server 140 determines based on a first part of the data (e.g., data 1A) pertaining to the movement of the vehicle whether the vehicle 110 has stopped for an interval of time in a location (delivery location 114) from a set of one or more scheduled delivery locations for the vehicle 110.

In response to determining that the vehicle 110 has stopped at the location from the set of scheduled delivery locations for the vehicle during the interval of time, the flow of operations moves to operation 340, at which the management server 140 automatically determines based on a second part of the data (e.g., data 1B), whether offload of cargo from the vehicle 110 occurred. The second part of the data (1B) includes at least some data collected from the set or one or more other devices on the vehicle and external to the gateway device. In some embodiments, a device from the set of devices that are external to the gateway device 105 was installed by the manufacturer of the vehicle as a safety measure, and the data it generates is being repurposed to detect activity indicative of the offload of cargo from the vehicle. In some embodiments, at least one of the set of one or more other devices is an aftermarket device installed on the vehicle and is designed to be installed on vehicles regardless of the make and model of the vehicle.

The second part of the data (1B) is consistent with activity indicative of the offload of cargo from the vehicle as opposed to data collected based on a tag on an item. Thus as opposed to conventional package delivery mechanisms that rely on tags added to a package and/or an item to be delivered to identify the item and which require a person to scan the tag at the time of delivery to confirm that this delivery has occurred, the present embodiments rely on information and data related to activity indicative of the offload of cargo that is automatically obtained through the gateway device 105.

Responsive to automatically determining that the offload of cargo from the vehicle occurred, the flow of operations moves to operation 350, at which the management server 140 automatically transmits a report to a user device, wherein the report includes information to be used as proof of delivery of the untagged item at the location. The transmission of the report is automatically performed without requiring a person to confirm (by scanning a tag, entering a confirmation, obtaining a signature on a paper, etc.) that the delivery occurred. In some embodiments, responsive to determining that the offload of cargo does not occur (e.g., by determining that the driver did not leave the vehicle, and/or that the cargo is still present in the vehicle) the management server 140 may transmit (360) an alert indicating that the cargo has not been delivered. The alert can be transmitted to a user device of the driver of the vehicle 110. The alert can be transmitted to a user device of the manager of the driver to alert that delivery is delayed or not yet performed. The alert can be transmitted to a user device of the customer expecting the delivery.

FIG. 4A illustrates a flow diagram of exemplary operations for receiving a first part of data from the gateway device, in accordance with some embodiments. In some embodiments, the first part of the data sent by the gateway device, which is indicative of the movement of the vehicle, includes multiple location readings recorded for the vehicle 110 at different times during an interval of time. For example, the data pertaining to the movement of the vehicle 110 can include location readings recorded by a location sensor. The location sensor can be located within or outside of the gateway device 105. For example, the location sensor can be a GPS sensor and the location readings are GPS coordinates. The location readings include one or more readings indicating the location of the vehicle at one or more times during the interval of time. In some embodiments, each location reading can include a longitude, latitude and an associated timestamp. The timestamp can indicate the time at which the latitude and longitude were recorded by the location sensor; alternatively the timestamp can indicate the time at which the latitude, longitude are transmitted from the gateway device or received by the management server 140.

FIG. 4B illustrates a flow diagram of exemplary operations for determining based on a first part of the data, when the first part of the data includes location readings, whether the vehicle has stopped for an interval of time in a location from a set of delivery locations scheduled for the vehicle, in accordance with some embodiments. At operation 430, the management server 140 determines that a difference between pairs of a subset of the plurality of location readings is smaller than a predetermined location difference threshold indicating that the vehicle remains at a same location during the interval of time. This indicates that the vehicle remains at a same location during the interval of time. In some embodiments, the predetermined location difference threshold can be zero indicating that the location readings are identical over the interval of time. In other embodiments, the predetermined location difference threshold is a small value that is greater than zero allowing the management server 140 to account for measurement errors that may be caused by the location sensor. In some embodiments, instead of determining that all location measures satisfy the difference criteria the vehicle stops monitor 210 may determine that the vehicle remains at a same location when at least a subset of location readings that is strictly less than the entire set of the location readings received for the interval of time satisfies the threshold criteria. For example, the management server 140 can determine that the vehicle 110 has stopped at a given location for a given interval of time, if a significant percentage (e.g., 80%, 90%, etc.) of the location readings received for that interval of time is sufficiently close to one another (i.e., the difference between pairs of the location readings is smaller than the predetermined location difference threshold).

The flow then moves to operation 440, at which the management server 140 determines that the location is included in a set of scheduled delivery locations for the vehicle. In some embodiments, the management server 140 includes information related to deliveries that are to be performed by the vehicle and reconciles this information with the location of the vehicle to confirm whether this location is part of delivery locations scheduled for the vehicle.

FIG. 5A illustrates a flow diagram of exemplary operations for receiving data from the gateway device, in accordance with some embodiments. In some embodiments, the first part of the data sent by the gateway device includes (410) a location reading and a plurality of speed measures recorded for the vehicle.

The data (1A) pertaining to the movement of the vehicle 110 can include speed measures. The speed measures can be obtained by the gateway device 105 from the vehicle's computing device or alternatively computed by the gateway device 105 based on accelerations measures and/or location readings for the vehicle. The speed measures include one or more readings indicating the speed of the vehicle at different times. In some embodiments, each speed measure is associated with a timestamp. The timestamp can indicate the time at which the speed is determined by the gateway device 105; alternatively the timestamp can indicate the time at which the speed measure is transmitted from the gateway device or received by the management server 140.

FIG. 5B illustrates a flow diagram of exemplary operations for determining based on a first part of the data, which includes a location reading and multiple speed measures, whether the vehicle has stopped for an interval of time in a location from a set of delivery locations scheduled for the vehicle, in accordance with some embodiments. At operation 530, the management server 140 determines that each of at least a subset of the plurality of speed measures is smaller than a predetermined speed measure threshold indicating that the vehicle is immobile during the interval of time.

In these embodiments, the management server 140 determines whether the vehicle has stopped in a given location by determining that each one of the multiple speed measures, received during an interval of time, is smaller than a predetermined speed measure threshold. This indicates that the vehicle remains immobile during the interval of time. In some embodiments, the predetermined speed measure threshold can be zero indicating that the vehicle is not moving during the interval of time. In other embodiments, the predetermined speed measure threshold is a small value that is greater than zero allowing the vehicle stops monitor 210 to account for measurement errors that may be caused by the sensor recording the speed (or acceleration from which the speed is derived). In some embodiments, instead of determining that all speed measures satisfy the threshold criteria the management server may determine that the vehicle remains immobile when at least a subset that is less than the entire set of the speed measures satisfies the threshold criteria. For example, the vehicle stops monitor 210 can determine that the vehicle 110 remains immobile at a given location for a given interval of time, if a significant percentage (e.g., 80%, 90%, etc.) of the speed measures is sufficiently close from one another and from the predetermined speed threshold for the given interval of time.

The flow then moves to operation 540, at which the management server 140 determines that the location is included in a set of scheduled delivery locations for the vehicle. In some embodiments, the management server 140 includes information related to deliveries that are to be performed by the vehicle and reconciles this information with the location of the vehicle to confirm whether this location is part of delivery locations scheduled for the vehicle.

While FIGS. 4A-B and FIGS. 5A-B describe mechanisms for determining that a vehicle has stopped at a given location for an interval of time, other mechanisms can be used to determine that the vehicle has stopped at a given location and remains at that location during a given interval of time. For example, the management server 140 can determine using a combination of location readings and speed measures that the vehicle has stopped after being in movement at a given location. In some embodiments, the management server 140 can detect when the vehicle stops by receiving data indicating that the engine of the vehicle is idle.

Figure 6:
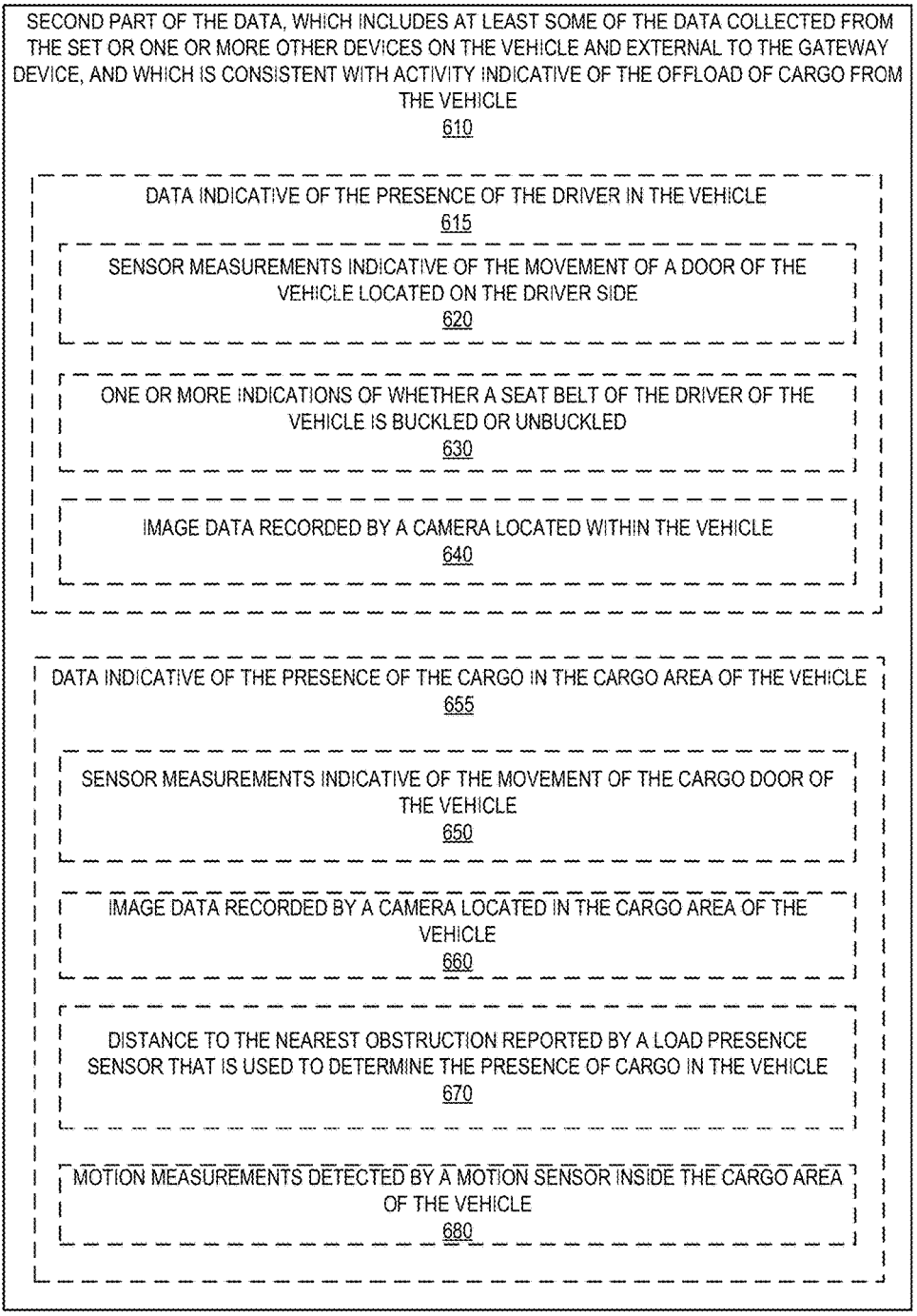
FIG. 6 illustrates a flow diagram of exemplary data included in the second part of data and which is consistent with activity indicative of the offload of cargo from the vehicle, in accordance with some embodiments.

FIG. 6 illustrates a flow diagram of exemplary data included in the second part of data and which is consistent with activity indicative of the offload of cargo from the vehicle, in accordance with some embodiments. Several types of data can be consistent with activity indicative of the offload of cargo from the vehicle. For example, the second part of data (610) can include sensor measurements or image data (615) indicative of the presence of the driver in the vehicle and/or sensor measurements or image data (655) indicative of the presence of cargo in the vehicle.

The data (615) that is indicative of the presence of the driver in the vehicle (can include sensor measurements (620) indicative of the movement of a door of the vehicle located on the driver side, one or more indications (630) of whether a seat belt of the driver of the vehicle is buckled or unbuckled, and/or image data (640) recorded by a camera located within the vehicle.

The data (655) indicative of the presence of the cargo in the cargo area of the vehicle includes sensor measurements (650) indicative of the movement of the cargo door of the vehicle, image data (660) recorded by a camera located in the cargo area of the vehicle, distance to the nearest obstruction (670) reported by a load presence sensor that is used to determine the presence of cargo in the vehicle, and/or motion measurements (680) detected by a motion sensor inside the cargo area of the vehicle.

One or a combination of the data (610) can be used to determine activity indicative of offload of cargo from the vehicle and to automatically determine that delivery of an untagged item has occurred.

FIG. 7 illustrates a flow diagram of exemplary operations for automatically determining based on a second part of the data, which is consistent with activity indicative of the offload of cargo from the vehicle as opposed to data collected based on a tag on an item, whether offload of cargo from the vehicle occurred, in accordance with some embodiments. One or more of the operations from FIG. 7 can be performed to automatically determine that offload of cargo from a vehicle occurs. At operation 710, a determination based on the second part of the data that a door of the vehicle (e.g., a door located on the driver side of the vehicle or a cargo door) was opened at a first time. At operation 715, a determination based on the second part of the data that the door of the vehicle was closed at a second time that is later than the first time is performed; and a determination that a difference between the first time and the second time exceeds a predetermined threshold time is performed at operation 720. At operation 730, a determination based on the second part of the data that the seat belt of the driver is unbuckled during the interval of time is performed. At operation 735, a determination based on the second part of the data that a driver of the vehicle has left the vehicle during the interval of time is performed. At operation 740, a determination that the cargo was offloaded is performed based on image data recorded by a camera located in the cargo area of the vehicle. At operation 745, a determination that the cargo was offloaded is performed based on a distance to the nearest obstruction reported by a load presence sensor. At operation 750, the management server 140 detects movement inside the cargo area of the vehicle based on motion measurements detected by a motion sensor.

While the embodiments above were described with a single vehicle 110, in some embodiments, the vehicle 110 is not the only vehicle within a determined geographical perimeter (e.g., a trailer yard, a warehouse location, a customer's location, etc.) and the management server 140 receives data from several gateway devices located on respective vehicles in that geographic perimeter. In these embodiments, the management server 140 may determine that a delivery occurred at a delivery location by automatically determining that activity consistent with offload of cargo is detected based on data received from a gateway device of one or of the vehicles while no activity consistent with offload of cargo is detected for the other vehicles located within the same geographic perimeter.

In one embodiment, the management server 140 works for both single and multi-tenant installations, meaning that multiple organizations with different administrators may have gateway devices managed by the same management server. In these embodiments, vehicles of two organizations may be located within a same geographical perimeter (e.g., at a same trailer yard). In these embodiments, the management server 140 can filter the vehicles by organization prior to automatically determining that delivery of items occurred.

The operations described herein enable an automatic detection that a delivery of an untagged or untracked item has occurred. A management server upon receipt of data from the gateway device automatically determines that the vehicle has reached a delivery location scheduled for the vehicle and automatically determines that cargo is being offloaded (or that offload of the cargo has been completed) from the vehicle. These determinations enable the management server to generate a report for an interested user (e.g., manager, customer, driver, etc.) that the delivery has occurred without receiving an input from a person involved in the delivery or requiring identification of the delivered item through a tagging mechanism. For example, the driver of the vehicle does not need to scan a tag added to the item to identify and confirm delivery of the item at the delivery location. Further, the person receiving the delivered item does not need to sign and/or confirm receipt of the item. Thus, the proof of delivery is obtained without requiring individual or group tracking/tagging of the delivered items and without requiring a signature for the delivery. These techniques present several advantages when compared with existing solutions of proof-of-delivery. In particular in scenarios where the tagging or tracking of individual item is not an option of interest (e.g., delivery of school meals, delivery of bakery items, delivery of construction material to construction sites, etc.), the automatic detection that a delivery occurred is advantageous. The techniques presented herein are less expensive, more accurate than a conventional paper proof-of-delivery system, and less error prone than systems relying on tag scanning where a person is relied on for scanning and confirming the delivery of the item. In addition, the techniques described herein allow a real time reporting of the delivery as alerts can be transmitted (confirming delivery or not) when the vehicle stops at a delivery location.

Architecture

The gateway devices and the management server described with reference to FIGS. 1-7 are electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 8:
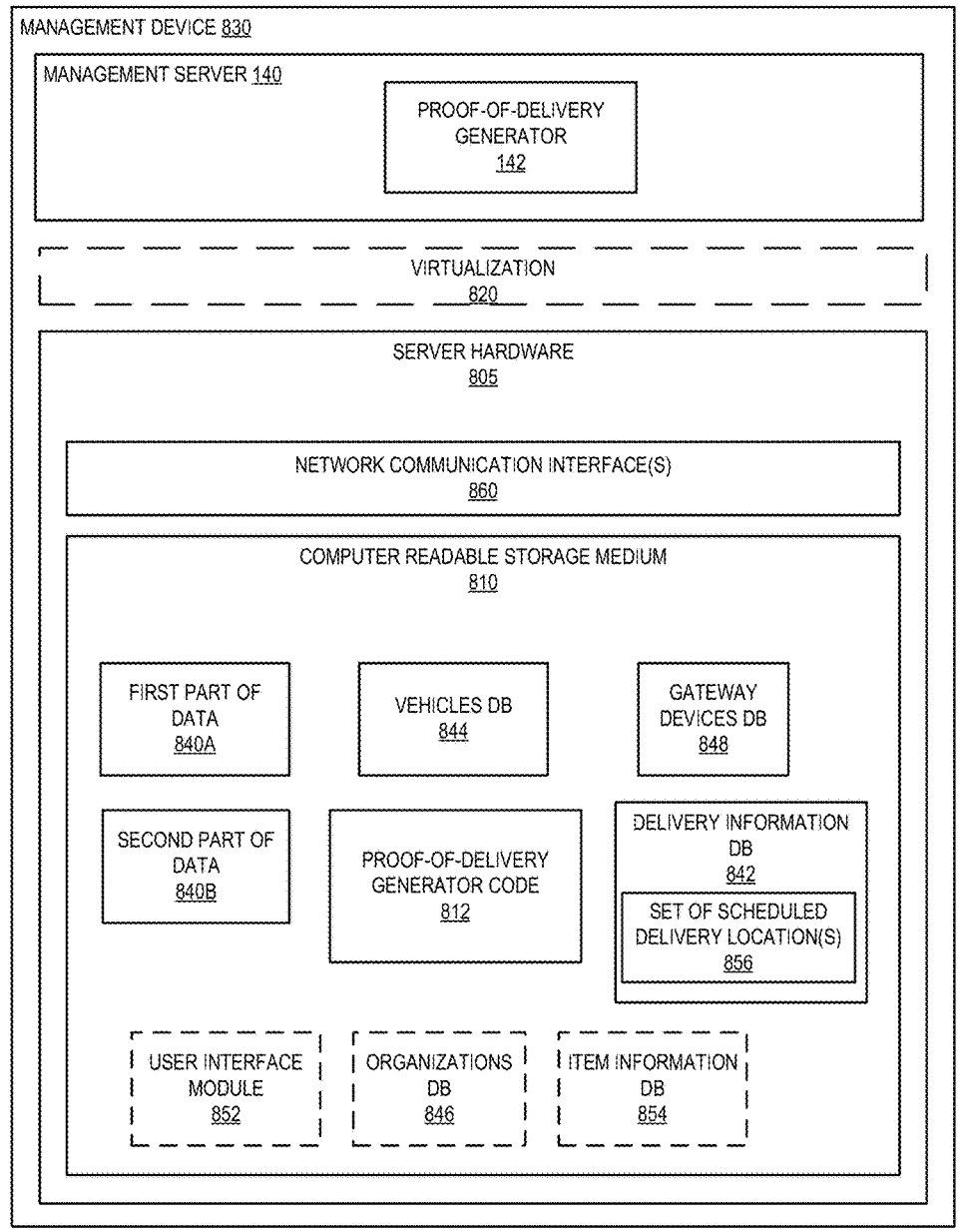
FIG. 8 illustrates a block diagram for an exemplary server management that can be used in some embodiments.

FIG. 8 illustrates a block diagram for an exemplary server management that can be used in some embodiments. Management server 140 may be a Web or cloud server, or a cluster of servers, running on server hardware. In one embodiment, the management server 140 works for both single and multi-tenant installations, meaning that multiple organizations with different administrators may have wireless sensing devices and gateway devices managed by the same management server.

According to one embodiment, management server 140 is implemented on a server device 830, which includes server hardware 805. Server hardware 805 includes network communication interfaces 860 coupled with a computer readable storage medium 810. The computer readable storage medium 810 includes proof-of-deliver generator code 812. The computer readable storage medium 810 includes a first part of data 840A 842 (including data sent by the gateway device and pertaining to movement of a vehicle on which the gateway device is located), a second part of data 840B (including data sent by the gateway device and consistent with activity indicative of the offload of cargo from the vehicle), vehicles database 844 (including information regarding the vehicles), an organizations database 846 (including information regarding the organizations to which the gateway devices, the vehicles, or the trailers belong); a gateway devices database 848 (including information regarding the gateway devices), an item information database 854 (including information about the items to be delivered (such as the type of items, the number of items, etc.), and a delivery information database 842 (including information related to deliveries that are to be made and which includes the set of scheduled delivery locations 856 for each vehicle dispatched).

While one embodiment does not implement virtualization, alternative embodiments may use different forms of virtualization—represented by a virtualization layer 820. In these embodiments, the management server 140 and the hardware that executes it form a virtual management server, which is a software instance of the modules stored on the computer readable storage medium 810.

Figure 9:
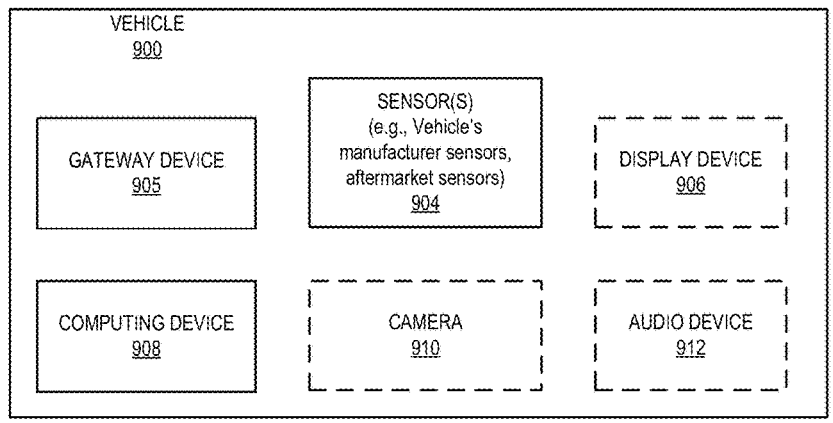
FIG. 9 illustrates a block diagram for an exemplary vehicle including a gateway device that can be used in some embodiments.

FIG. 9 illustrates a block diagram of an exemplary vehicle that can be used in some embodiments. Vehicle 900 includes a computing device 908. The computing device is an electronic device installed by the manufacturer of the vehicle. The vehicle 900 may include one or more sensors that can be installed by the manufacturer of the vehicle or aftermarket sensors. The sensors are electronic devices operative to record and transmit data through the gateway device 905 towards the management server. The vehicle may further include a camera 910, a display device 906, and an audio device 912. The display device 906 and the audio device 912 can be used to present the alerts to a driver of the vehicle upon detection that the delivery of an item has not been made yet. In some embodiments, these devices can also be used to present a proof-of-delivery report to the driver of the vehicle as a result of the automatic determination that the delivery occurred.

Figure 10:
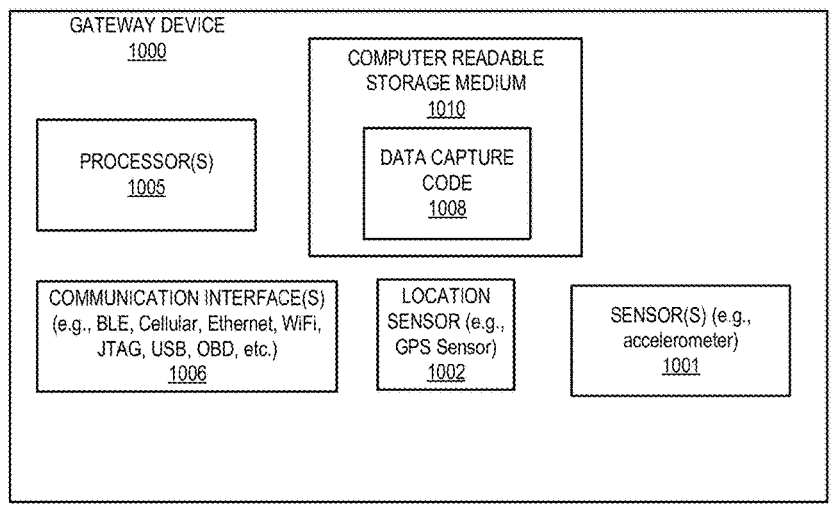
FIG. 10 illustrates a block diagram of an exemplary gateway device that can be used in some embodiments.

FIG. 10 illustrates a block diagram of an exemplary gateway device that can be used in some embodiments. Gateway device 1000 includes one or more processors 1005 and connected system components (e.g., multiple connected chips). The gateway device 1000 includes computer readable storage medium 1010, which is coupled to the processor(s) 1005. The computer readable storage medium 1010 may be used for storing data, metadata, and programs for execution by the processor(s) 1005. For example, the depicted computer readable storage medium 1010 may store data capture code 1008 that, when executed by the processor(s) 1005, causes the gateway device 1000 (e.g., gateway device 105) to transmit the data to the management server 140.

The gateway device 1000 also includes one or more sensors used to record sensor measurements in response to physical events. For example, the gateway device 1000 may include a location sensor (such as a GPS sensor) 1002 for recording location readings to indicate the location of the vehicle on which the gateway device is mounted. The gateway device 1000 may include one or more other sensors 1001 (e.g., an accelerometer).

The gateway device 1000 also includes one or more communication interfaces 1006, which are provided to allow a user to provide input to, receive output from, and otherwise transfer data to and from the system. Exemplary Input/Output devices and interfaces 1206 include wired and wireless transceivers, such as Joint Test Action Group (JTAG) transceiver, a Bluetooth Low Energy (LE) transceiver, an IEEE 802.11 transceiver, an infrared transceiver, a wireless cellular telephony transceiver (e.g., 2G, 3G, 4G), or another wireless protocol to connect the gateway device 1000 with another device, external component, or a network and receive stored instructions, data, tokens, etc. It will be appreciated that one or more buses may be used to interconnect the various components shown in FIG. 10.

It will be appreciated that additional components, not shown, may also be part of the gateway device 1000, and, in certain embodiments, fewer components than that shown in FIG. 10 may also be used in a gateway device 1000.

While some components of the gateway device, or the management server are illustrated as code stored on the computer readable storage medium, in other embodiments the modules may be implemented in hardware or in a combination of hardware and software. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, in a management server device located in the cloud, of automatically determining that a delivery of an untagged item occurred, the method comprising:
   receiving, from a gateway device located on a vehicle on which the untagged item is being transported, data including data collected by the gateway device from a set of one or more other devices on the vehicle and external to the gateway device;
   determining based on a first part of the data, which pertains to movement of the vehicle, whether the vehicle has stopped for an interval of time in a location from a set of one or more scheduled delivery locations for the vehicle;
   responsive to determining that the vehicle has stopped at the location from the set of scheduled delivery locations for the vehicle during the interval of time, automatically determining based on a second part of the data, which includes at least some data collected from the set or one or more other devices on the vehicle and external to the gateway device, and which is consistent with activity indicative of offload of cargo from the vehicle as opposed to data collected based on a tag on an item, whether offload of cargo from the vehicle occurred; and
   responsive to determining that the offload of cargo from the vehicle occurred, automatically transmitting a report to a user device, wherein the report includes information to be used as proof of delivery of the untagged item at the location.

2. The method of claim 1, wherein the first part of the data includes a plurality of location readings recorded for the vehicle at different times during the interval of time, and wherein the determining based on a first part of the data includes:
   determining that a difference between pairs of a subset of the plurality of location readings is smaller than a predetermined location difference threshold indicating that the vehicle remains at a same location during the interval of time; and
   determining that the location is included in a set of scheduled delivery locations for the vehicle.

3. The method of claim 1, wherein the first part of the data includes a location reading and a plurality of speed measures recorded for the vehicle, and wherein the determining based on a first part of the data includes:
   determining that each of at least a subset of the plurality of speed measures is smaller than a predetermined speed measure threshold indicating that the vehicle is immobile during the interval of time; and
   determining that the location is included in a set of scheduled delivery locations for the vehicle.

4. The method of claim 1, wherein a first device from the set of one or more other devices on the vehicle and external to the gateway device was installed by the manufacturer of the vehicle as a safety measure, wherein data that the first device generates is being repurposed to detect activity indicative of the offload of cargo from the vehicle.

5. The method of claim 1, wherein the gateway device and at least one of the set of one or more other devices are aftermarket devices installed on the vehicle and designed to be installed on vehicles regardless of a make and model of the vehicle.

6. The method of claim 1, wherein the second part of the data includes at least one of sensor measurements indicative of movement of a door of the vehicle located on a driver side, sensor measurements indicative of movement of a cargo door of the vehicle, one or more indications of whether a seat belt of a driver of the vehicle is buckled or unbuckled, and image data recorded by a camera located within the vehicle.

7. The method of claim 1, wherein the automatically determining based on the second part of the data includes:
   determining based on the second part of the data that a door of the vehicle located on a driver side was opened at a first time;
   determining based on the second part of the data that the door of the vehicle located on the driver side was closed at a second time that is later than the first time; and
   determining that a difference between the first time and the second time exceeds a predetermined threshold time.

8. The method of claim 1, wherein the automatically determining based on the second part of the data includes:
   determining based on the second part of the data that a cargo door of the vehicle was opened at a first time;
   determining based on the second part of the data that a cargo door of the vehicle was closed at a second time that is later than the first time; and
   determining that a difference between the first time and the second time exceeds a predetermined threshold time.

9. The method of claim 1, wherein the automatically determining based on the second part of the data includes:
determining based on the second part of the data that a seat belt of a driver of the vehicle is unbuckled during the interval of time.

10. The method of claim 1, wherein the automatically determining based on the second part of the data includes:
determining based on the second part of the data that a driver of the vehicle has left the vehicle during the interval of time.

11. A management server device located in the cloud for automatically determining that a delivery of an untagged item occurred, the management server device comprising:
a non-transitory computer readable storage medium to store instructions; and
a processor coupled with the non-transitory computer readable storage medium to process the stored instructions to:
receive from a gateway device located on a vehicle on which the untagged item is being transported, data including data collected by the gateway device from a set of one or more other devices on the vehicle and external to the gateway device,
determine based on a first part of the data, which pertains to movement of the vehicle, whether the vehicle has stopped for an interval of time in a location from a set of one or more scheduled delivery locations for the vehicle,
responsive to determining that the vehicle has stopped at the location from the set of scheduled delivery locations for the vehicle during the interval of time, automatically determine based on a second part of the data, which includes at least some data collected from the set or one or more other devices on the vehicle and external to the gateway device, and which is consistent with activity indicative of offload of cargo from the vehicle as opposed to data collected based on a tag on an item, whether offload of cargo from the vehicle occurred, and
responsive to determining that the offload of cargo from the vehicle occurred, automatically transmit a report to a user device, wherein the report includes information to be used as proof of delivery of the untagged item at the location.

12. The management server device of claim 11, wherein the first part of the data includes a plurality of location readings recorded for the vehicle at different times during the interval of time, and wherein to determine based on a first part of the data includes to:
determine that a difference between pairs of a subset of the plurality of location readings is smaller than a predetermined location difference threshold indicating that the vehicle remains at a same location during the interval of time; and
determine that the location is included in a set of scheduled delivery locations for the vehicle.

13. The management server device of claim 11, wherein the first part of the data includes a location reading and a plurality of speed measures recorded for the vehicle, and wherein to determine based on a first part of the data includes to:
determine that each of at least a subset of the plurality of speed measures is smaller than a predetermined speed measure threshold indicating that the vehicle is immobile during the interval of time; and
determine that the location is included in a set of scheduled delivery locations for the vehicle.

14. The management server device of claim 11, wherein a first device from the set of one or more other devices on the vehicle and external to the gateway device was installed by the manufacturer of the vehicle as a safety measure, wherein data that the first device generates is being repurposed to detect activity indicative of the offload of cargo from the vehicle.

15. The management server device of claim 11, wherein the gateway device and at least one of the set of one or more other devices are aftermarket devices installed on the vehicle and designed to be installed on vehicles regardless of a make and model of the vehicle.

16. The management server device of claim 11, wherein the second part of the data includes at least one of sensor measurements indicative of movement of a door of the vehicle located on a driver side, sensor measurements indicative of movement of a cargo door of the vehicle, one or more indications of whether a seat belt of a driver of the vehicle is buckled or unbuckled, and image data recorded by a camera located within the vehicle.

17. The management server device of claim 11, wherein to automatically determine based on the second part of the data includes to:
determine based on the second part of the data that a door of the vehicle located on a driver side was opened at a first time;
determine based on the second part of the data that the door of the vehicle located on the driver side was closed at a second time that is later than the first time; and
determine that a difference between the first time and the second time exceeds a predetermined threshold time.

18. The management server device of claim 11, wherein to automatically determine based on the second part of the data includes to:
determine based on the second part of the data that a cargo door of the vehicle was opened at a first time;
determine based on the second part of the data that a cargo door of the vehicle was closed at a second time that is later than the first time; and
determine that a difference between the first time and the second time exceeds a predetermined threshold time.

19. The management server device of claim 11, wherein to automatically determine based on the second part of the data includes to:
determine based on the second part of the data that a seat belt of a driver of the vehicle is unbuckled during the interval of time.

20. The management server device of claim 11, wherein to automatically determine based on the second part of the data includes to:
determine based on the second part of the data that a driver of the vehicle has left the vehicle during the interval of time.

21. A non-transitory computer readable storage medium that provide instructions, which when executed by a processor of a management server device located in the cloud, cause said processor to perform operations comprising:
receiving, from a gateway device located on a vehicle on which an untagged item is being transported, data including data collected by the gateway device from a set of one or more other devices on the vehicle and external to the gateway device;
determining based on a first part of the data, which pertains to movement of the vehicle, whether the vehicle has stopped for an interval of time in a location from a set of one or more scheduled delivery locations for the vehicle;

responsive to determining that the vehicle has stopped at the location from the set of scheduled delivery locations for the vehicle during the interval of time, automatically determining based on a second part of the data, which includes at least some data collected from the set or one or more other devices on the vehicle and external to the gateway device, and which is consistent with activity indicative of offload of cargo from the vehicle as opposed to data collected based on a tag on an item, whether offload of cargo from the vehicle occurred; and responsive to determining that the offload of cargo from the vehicle occurred, automatically transmitting a report to a user device, wherein the report includes information to be used as proof of delivery of the untagged item at the location.

22. The non-transitory computer readable storage medium of claim 21, wherein the first part of the data includes a plurality of location readings recorded for the vehicle at different times during the interval of time, and wherein the determining based on a first part of the data includes:
  determining that a difference between pairs of a subset of the plurality of location readings is smaller than a predetermined location difference threshold indicating that the vehicle remains at a same location during the interval of time; and
  determining that the location is included in a set of scheduled delivery locations for the vehicle.

23. The non-transitory computer readable storage medium of claim 21, wherein the first part of the data includes a location reading and a plurality of speed measures recorded for the vehicle, and wherein the determining based on a first part of the data includes:
  determining that each of at least a subset of the plurality of speed measures is smaller than a predetermined speed measure threshold indicating that the vehicle is immobile during the interval of time; and
  determining that the location is included in a set of scheduled delivery locations for the vehicle.

24. The non-transitory computer readable storage medium of claim 21, wherein a first device from the set of one or more other devices on the vehicle and external to the gateway device was installed by the manufacturer of the vehicle as a safety measure, wherein data that the first device generates is being repurposed to detect activity indicative of the offload of cargo from the vehicle.

25. The non-transitory computer readable storage medium of claim 21, wherein the gateway device and at least one of the set of one or more other devices are aftermarket devices installed on the vehicle and designed to be installed on vehicles regardless of a make and model of the vehicle.

26. The non-transitory computer readable storage medium of claim 21, wherein the second part of the data includes at least one of sensor measurements indicative of movement of a door of the vehicle located on a driver side, sensor measurements indicative of movement of a cargo door of the vehicle, one or more indications of whether a seat belt of a driver of the vehicle is buckled or unbuckled, and image data recorded by a camera located within the vehicle.

27. The non-transitory computer readable storage medium of claim 21, wherein the automatically determining based on the second part of the data includes:
  determining based on the second part of the data that a door of the vehicle located on a driver side was opened at a first time;
  determining based on the second part of the data that the door of the vehicle located on the driver side was closed at a second time that is later than the first time; and
  determining that a difference between the first time and the second time exceeds a predetermined threshold time.

28. The non-transitory computer readable storage medium of claim 21, wherein the automatically determining based on the second part of the data includes:
  determining based on the second part of the data that a cargo door of the vehicle was opened at a first time;
  determining based on the second part of the data that a cargo door of the vehicle was closed at a second time that is later than the first time; and
  determining that a difference between the first time and the second time exceeds a predetermined threshold time.

29. The non-transitory computer readable storage medium of claim 21, wherein the automatically determining based on the second part of the data includes:
  determining based on the second part of the data that a seat belt of a driver of the vehicle is unbuckled during the interval of time.

30. The non-transitory computer readable storage medium of claim 21, wherein the automatically determining based on the second part of the data includes:
  determining based on the second part of the data that a driver of the vehicle has left the vehicle during the interval of time.

* * * * *